United States Patent [19]

Van Boekel

[11] Patent Number: 5,639,489

[45] Date of Patent: Jun. 17, 1997

[54] ELECTRICALLY HEATED MANIFOLD SYSTEM IN AN INJECTION MOULDING STRUCTURE

[75] Inventor: Franciscus Antonius Josef Van Boekel, En Dordrecht, Netherlands

[73] Assignee: Eurotools Beheer B.V., 's-Gravendeel, Netherlands

[21] Appl. No.: 516,548

[22] Filed: Aug. 18, 1995

[51] Int. Cl.⁶ .................................................. B29C 45/72
[52] U.S. Cl. ................ 425/547; 264/328.8; 264/328.14; 264/328.15; 425/549; 425/570; 425/572
[58] Field of Search ............................. 425/549, 572, 425/547, 548, 570, 571, 573, 581, 588; 264/328.15, 328.8, 328.14, 297.2

[56] References Cited

U.S. PATENT DOCUMENTS

| | | | |
|---|---|---|---|
| 5,227,179 | 7/1993 | Benenati | 425/572 |
| 5,235,737 | 8/1993 | Gellert | 425/549 |
| 5,266,023 | 11/1993 | Renwick | 425/549 |
| 5,429,491 | 7/1995 | Gellert | 425/549 |
| 5,507,635 | 4/1996 | Gellert | 425/549 |
| 5,507,636 | 4/1996 | Gellert | 425/549 |

*Primary Examiner*—Tim Heitbrink
*Attorney, Agent, or Firm*—Young & Thompson

[57] ABSTRACT

Electrically heated manifold system in an injection moulding structure, the system comprising a manifold element, the manifold element being adapted to direct molten plastics material from the extruding device to the mould-cavity, and bearing an inlet-gate at one side for connection to the outlet nozzle of a plastics extruding device, an elongate bore system leading from the said inlet-gate to at least one outlet-gate at the other side of the manifold-element to connect with at least one opening in a cavity-plate having a mould-cavity, the bore system branching into as many respective outlet-gates as there are openings in the corresponding cavity-plate, the manifold-element further having at least one elongated electrical heating body provided in heating relationship with the bore system and preferably distinct there from, the electrical heating body having opposite free in- and output ends projecting from the manifold-element, the ends connected by separate electrically isolated lead-elements to the respective in- and output of an electrical power supply, wherein the ends of the electrical heating body are each connected to the lead-elements by individual connector bodies having an outer surface of heat resistant, electrically isolating, preferably anorganic, material of e.g. ceramics, and an internal metal or equivalent electrically conductive body of heat resistant material and carrying fastening means to fix both the said ends and the lead-elements in an electrically conductive manner to the said internal electrically conductive body.

4 Claims, 2 Drawing Sheets

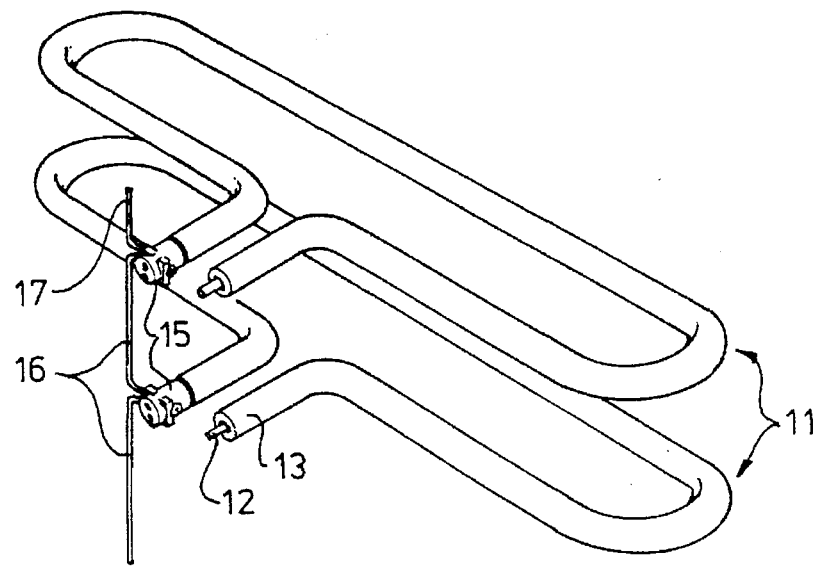
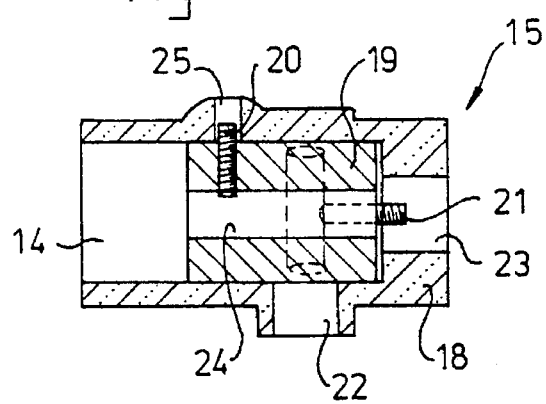
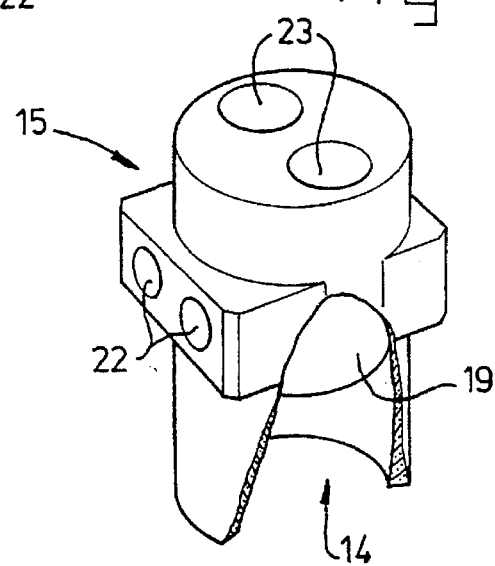

ELECTRICALLY HEATED MANIFOLD SYSTEM IN AN INJECTION MOULDING STRUCTURE

BACKGROUND OF THE INVENTION

This invention relates generally to injection moulding and more particularly to an electrically heated manifold system in an injection moulding structure. Especially, this invention is concerned with the connection of the electrical heating body of the electrical heated manifold system to an electrical power supply.

It is well-known to have the electrical heating body of an electrically heated manifold system in an injection moulding structure connected to the electrical power supply by using self-adhesive, preferably pressure sensitive, tape, wrapped around the respective overlapping ends of the electrical heating body and the electrical power supply at the electrical connection. However, wrapping tape is time consuming on the one hand. On the other hand, the tape, usually of thermoplastics material, suffers from ageing due to e.g. temperature cycling which could yield malfunction of the system. Furthermore, disconnecting the electrical heating body from the electrical power supply, e.g. for maintenance purposes, is rather elaboreous and unattractive since the tape and also the connected ends are rather sticky from the selfadhesive of the tape.

SUMMARY OF THE INVENTION

Accordingly, it is an object of the present invention to at least partially overcome the disadvantages of the prior art by providing an improvement in the field of connecting the electrical heating body to the power supply by using individual connector bodies.

To this end, in one of its aspects, the invention provides an electrically heated manifold system in an injection moulding structure, the system comprising a manifold element, the manifold element being adapted to direct molten plastics material from the extruding device to the mould-cavity, and bearing an inlet-gate at one side for connection to the outlet nozzle of a plastics extruding device, an elongate bore system leading from the said inlet-gate to at least one outlet-gate at the other side of the manifold-element to connect with at least one opening in a cavity-plate having a mould-cavity, the bore system branching into as many respective outlet-gates as there are openings in the corresponding cavity-plate, the manifold-element further having at least one elongated electrical heating body provided in heating relationship with the bore system and preferably distinct therefrom, the electrical heating body having opposite free in- and output ends projecting from the manifold-element, the ends connected by separate electrically isolated lead-elements to the respective in- and output of an electrical power supply, wherein the ends of the electrical heating body are each connected to the lead-elements by individual connector bodies having an outer surface of heat resistant, electrically isolating, preferably inorganic, material of e.g. ceramics, and an internal metal or equivalent electrically conductive body of heat resistant material and carrying fastening means to fix both the said ends and the lead-elements in an electrically conductive manner to the said internal electrically conductive body.

In a second aspect, the invention provides the use of a connector body in the electrically heating manifold system in an injection moulding structure, having an outer surface of heat resistant, electrically isolating, preferably anorganic material of e.g. ceramics, and an internal metal or equivalent electrically conductive body of heat resistant material, which outer surface provides at leat three holes, a first hole with large diameter for penetration by an end of an electrical heating body, a second and a third hole of smaller diameter for penetration by an electrical lead-body; which diameters are closely adapted to the diameter of said electrical heating body and said electrical lead-body, respectively, the internal electrically conductive body carries gates registered with said holes in the outer surface for penetration by said electrical heating body or said electrical lead body; an adjustable fastening element projects into a respective one of said holes from aside the connector body to fasten said electrical heating body or said electrical lead-body w.r.t. the hole.

Further objects and advantages of the invention will appear from the following description, taking together with the accompanying drawings as an example of how to put the invention into practice.

BRIEF DESCRIPTION OF THE DRAWINGS

FIG. 2 is a perspective view of two spaced apart electrical heating bodies for use in an injection moulding structure as according to FIG. 1, interconnected by individual connector bodies according to the invention;

FIG. 3 is a sectional view of an individual connector body of FIG. 2; and

FIG. 4 is perspective view, partly broken away, of the connector body of FIG. 3.

DETAILED DESCRIPTION OF THE DRAWINGS

Figure 1:
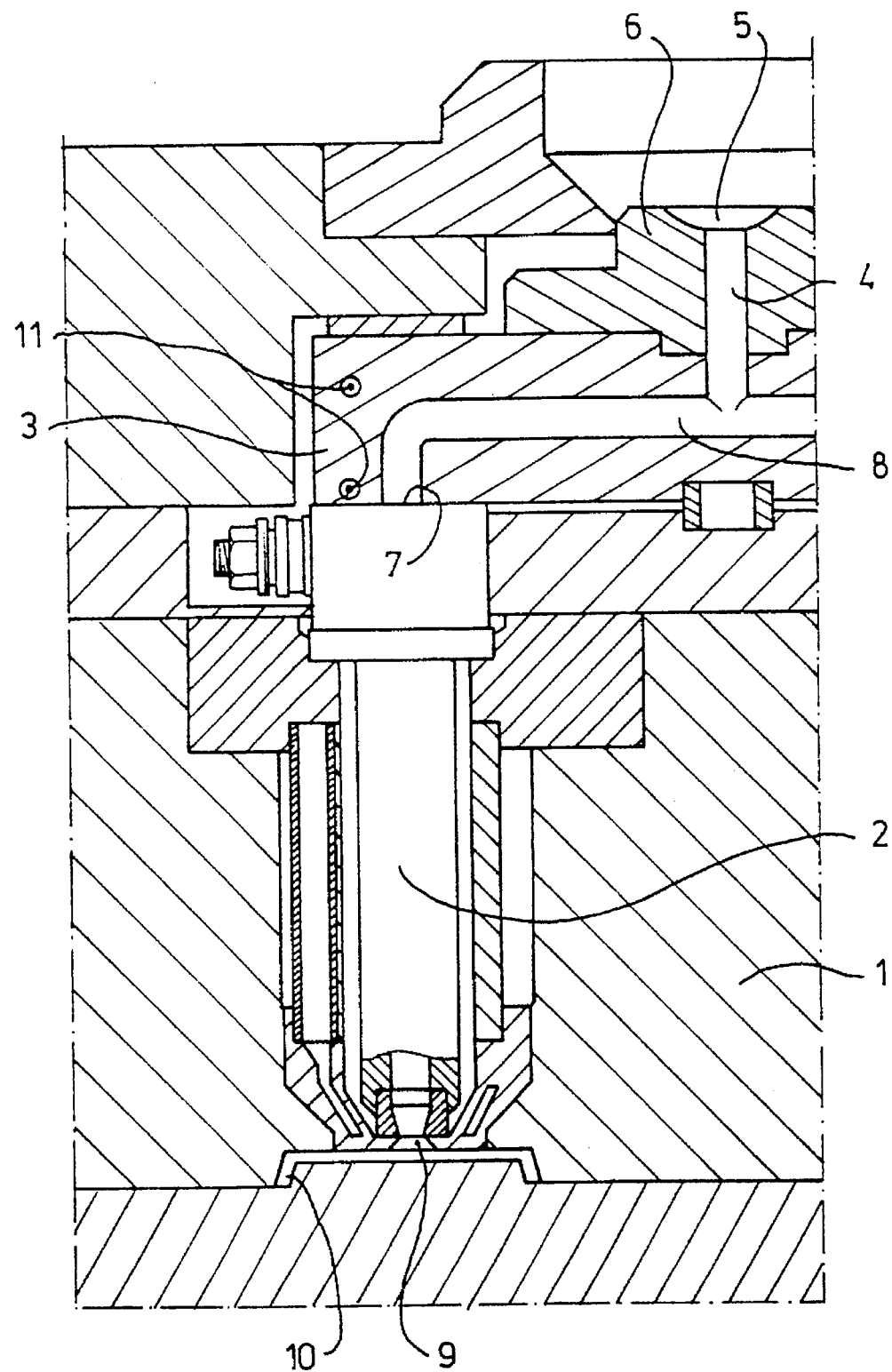
FIG. 1 is a sectional view of a portion of an injection moulding structure having an electrically heated manifold system according to one embodiment of the invention.

Reference is first made to FIG. 1 which shows a portion of a multi-cavity injection moulding structure having an electrically heated manifold system according to the invention. Indicated is a cavity plate 1 which receives a heated elongated nozzle 2. The nozzle 2 is secured to a common elongated manifold 3. A melt passage 4 extends through the manifold 3 from a recessed inlet 5 in a manifold extension 6 and branches to a number of outlets 7. Each branch 8 of the melt passage 4 extends through a central bore of the heated nozzle 2 to a gate 9 leading to a cavity 10.

The elongated manifold 3 is heated by two spaced elongated electrical heating bodies 11 with the branch 8 there between. The elongated electrical heating bodies are shown more in detail in FIG. 2. They each have a core 12 of electrically conductive material surrounded by electrically insulating and heat resistant material 13. The electrical heating bodies 11 are provided in heating relationship with the elongated manifold 3. At the respective ends of each elongated electrical heating body 11, the core 12 projects from its surrounding material 13, and is inserted into a first hole 14 of an individual connector body 15. In FIG. 2 it is merely shown how the input ends of both elongated electrical heating bodies 11 are in engagement with a respective individual connector body 15 for connection to an electrical power supply (not shown) with the aid of lead bodies 16. A further lead body 17 can optionally be used for connection to the input of e.g. control equipment. It will be clear to the specialist, how to bring the further projecting core ends 12 of FIG. 2 into engagement with further respective individual connector bodies 15 for electrically connecting them to a electrical power supply (not shown) with the aid of further lead-elements 16 and 17.

FIG. 3 and 4 show the connector body 15 more in detail. This embodiment of the connector body 15 as shown is nowadays preferred. It has an outer surface 18 of heat resistant, electrically insulating, preferably inorganic material of e.g. ceramics. There is further an internal metal or equivalent electrically conductive body 19, which is preferably also heat resistant. The internal body 19 also carries screws 20, 21 as fastening means. As is indicated in FIG. 4, the outer surface 18 is partly cylindrical and has one large hole 14 at one end and two smaller, spaced holes 23 at the opposite end. The large hole 14 is registered with a central hole 24 within the internal body 19. The size of the hole 24 is adapted to the diameter of the core 12, while the size of the hole 14 is adapted to the outer diameter of the material 13 sur- rounding the core 12 of the elongated electrical heating body 11. With this, the material 13 can be inserted into the hole 14 such that the core 12 projects into the hole 24 and can then be fixed to the connector body 15 by fastening the screw 20, which can be gripped by a tool via a hole 25 in the outer surface 18 of the connector body 15.

The two parallel spaced further holes 22 are perpendicular to the holes 14 and 24. A lead element 16, 17 can be inserted in a respective hole 22. With the aid of a screw 21, a lead element 16, 17, inserted into a hole 22, can be fastened. A screw 21 can be engaged by a tool by the hole 23 registered with the screw 21.

I claim:

1. Electrically heated manifold system in an injection molding structure, the system comprising a manifold element, the manifold element being adapted to direct molten plastic material from an extruding device to a mold cavity, the manifold element having an inlet gate for connection to an outlet nozzle of said plastic extruding device, an elongate bore system leading from the said inlet gate to at least one outlet gate to connect with at least one opening in a cavity plate having a mold cavity, the bore system branching into as many respective outlet gates as there are openings in the corresponding cavity plate, the manifold element further having at least two elongated electrical heating bodies provided in heating relationship with the bore system, each electrical heating body having opposite free input ends and output ends projecting from the manifold element, the ends connected by separate electrically insulated lead elements to the respective input and output of an electrical power supply, wherein the ends of the electrical heating body are each connected to the lead elements by individual connector bodies having an outer surface of heat resistant, electrically insulating material, and an internal electrically conductive body of heat resistant material and carrying fastening means to fix both the said ends and the lead elements in an electrically conductive manner to the said internal electrically conductive body, and wherein each connector body comprises a central bore for receiving a respective end of the heating body and two interconnection bores in electrical contact with the central bore for conductively interconnecting the connector bodies attached to the input ends and the output ends of the heating bodies respectively.

2. Electrically heated manifold system in an injection molding structure according to claim 1, wherein there are at least two separate electrical heating bodies and a first electrical lead element connecting the respective input ends to the one pole and a second electrical lead element connecting the respective output ends to the other pole of said power supply via said connector bodies.

3. Electrically heated manifold system in an injection molding structure according to claim 2, wherein each electrical lead system has a first lead body running from the power supply to the connector body of one of the electrical heating bodies and a second lead body running between the connector bodies of the respective input or output ends of said electrical heating bodies, the first lead body being connected to the connector body at a distance from the second lead body.

4. Electrically heated manifold system in an injection molding structure according to claim 1, wherein a first lead body runs from the power supply to a first interconnection bore of the connector bodies of one of the electrical heating bodies, a second lead body running between the second interconnection bore of said connector bodies and the interconnection bore of an adjacent connector body, the interconnection bores and the lead bodies extending generally transversely to the central bore.

* * * * *